July 2, 1929.  P. CHRISTIA ET AL  1,719,213
WHEEL
Filed Sept. 26, 1927   2 Sheets-Sheet 1
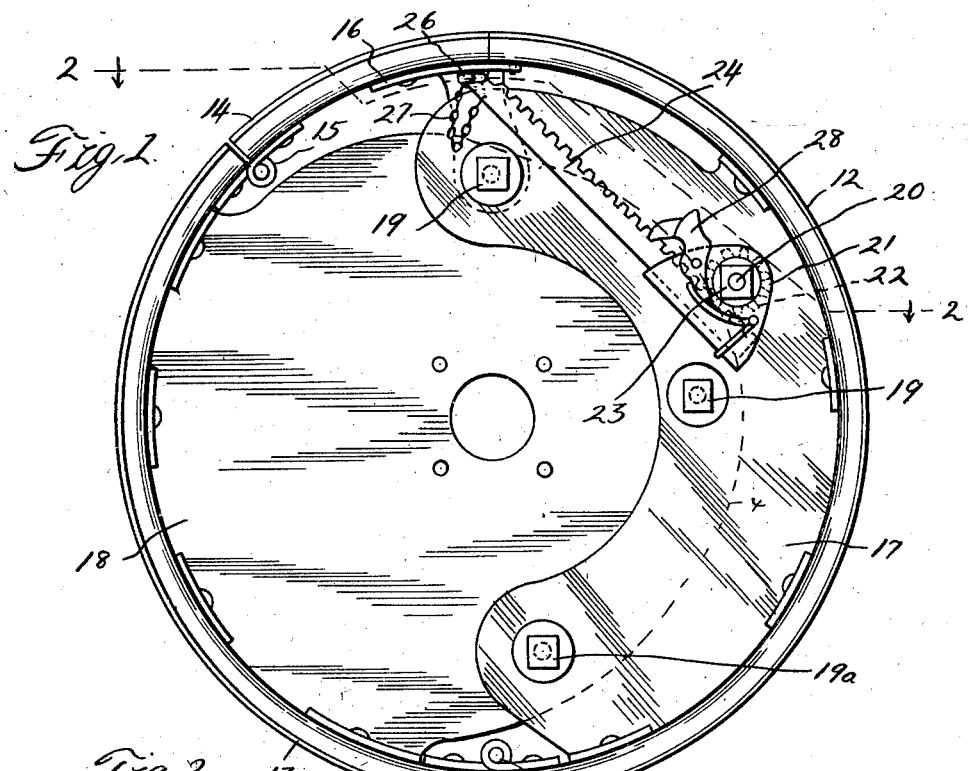
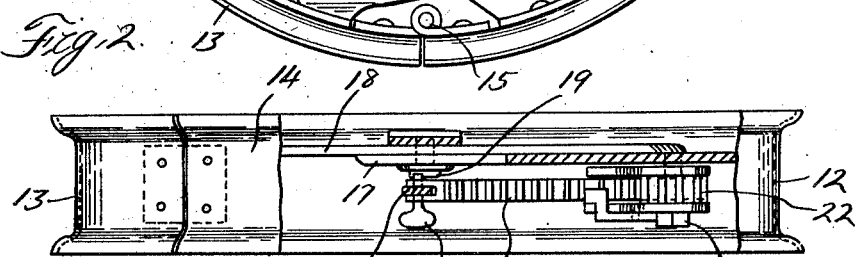
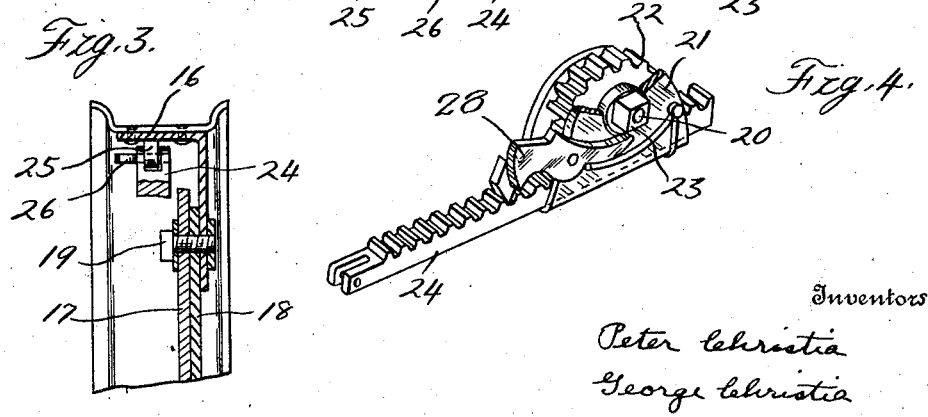
Inventors
Peter Christia
George Christia
By Swan Frye and Murray
Attorneys July 2, 1929.  P. CHRISTIA ET AL  1,719,213
WHEEL
Filed Sept. 26, 1927  2 Sheets-Sheet 2
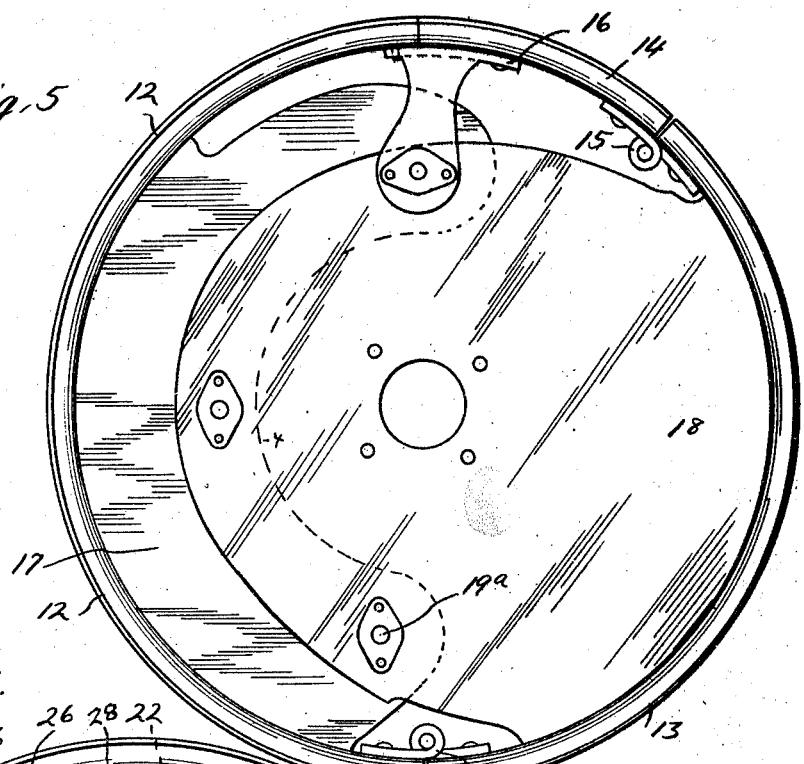
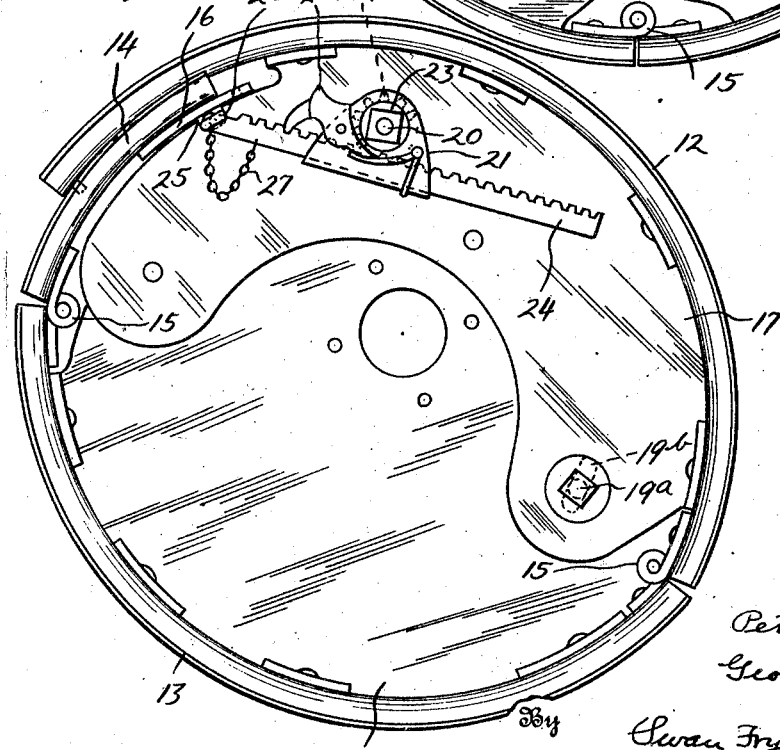

Patented July 2, 1929.

1,719,213

UNITED STATES PATENT OFFICE.

PETER CHRISTIA AND GEORGE CHRISTIA, OF DETROIT, MICHIGAN.

WHEEL.

Application filed September 26, 1927. Serial No. 221,962.

This invention relates to an improved and collapsible web and rim construction for vehicle wheels, and has for its object an improved organization of parts by means of which the ordinarily truly circular positioning of the rim sections relatively to one another may be either maintained intact, as for routine use of the wheel, or may be drawn away from truly circular position in order to facilitate the removal of a tire carried by the rim. In some respects it embodies features of construction and operation which have already been disclosed in our Patent No. 1,634,454, issued July 5, 1927, but the organization of parts herein disclosed calls for a smaller number of operative parts and makes possible a lighter finished construction and greater simplicity and ease of operation.

In the drawings:

Figure 1 is an elevational view of one side or face of the construction.

Figure 2 is an edge view taken from a posion above the wheel and partly in section, as indicated by the broken line 2—2 of Figure 1.

Figure 3 is a detail elevational view partly in section, showing the positioning of the various parts relatively to the plane of the wheel as a whole.

Figure 4 is a detail perspective showing the gear and ratchet construction used for accomplishing the indrawing of the parts.

Figure 5 is an elevational view of the opposite side of the wheel from that shown in Figure 1.

Figure 6 is an elevational view taken from the same side of the wheel structure as shown in Figure 1, but showing the parts in indrawn or collapsed position.

It will be understood that a tire of any suitable form is designed to be mounted upon the circular rim formed by the sections 12, 13 and 14, all of which are correlated at their meeting ends by some such means as hinges 15, except the meeting ends of sections 12 and 14, the latter of which is preferably considerably shorter or smaller than the sections 12 and 13. The under face of the free end of the section 14 is preferably provided with a reinforcing plate or lip 16, whose outer end extends beyond its end, and under the adjacent free end of the plate 12.

Extending interiorly from the concave side of each of the rim sections 12 and 13 are web sections 17 and 18, which, even when the device is in fully extended position, overlap somewhat, as indicated by the dotted lines 4 in Figures 1 and 5, and of course still more when the parts of the device are contracted or indrawn as brought out in Figure 6. When in the extended position shown in Figures 1 and 5, these web sections are held in locked relation by means of the easily removable nuts or screws 19, though the number of these elements to be used need not correspond with the three herein illustrated. And while we find it preferable to permanently leave one of the screws, as 19$^a$, in position, and free to move in the slot 19$^b$ in the web 18 as the webs are expanded and contracted, this arrangement is not indispensable.

From one of the web sections, as 17, there projects a pin or stud 20, over which there removably engages a cage or shell 21, in which is rotatably housed a gear wheel 22, through whose apertured center portion the pin 20 extends. The outer end of this gear wheel 22 is circular in form and projects through the shell of the cage 21 so as to rotate in it as a bearing, and is formed at its outer end into a rectangular (or, if desired, hexagonal) terminal 23, over which the correspondingly contoured end of a wrench or key may be positioned to effect the rotation of the gear wheel 22. Slidably engaging through a portion of the shell or cage 21 not occupied by the gear wheel 22 is a ratchet bar 24, whose teeth are engaged by the teeth of the gear wheel 22, so that as the latter is rotatably actuated the bar is projected or retracted relatively to the cage or shell 21, and consequently to its supporting web 17. The outer end of this ratcheted bar is connected with a suitable eye or anchorage 25, preferably formed on the under side of the lip 16 which is carried by the rim section 14. Our preferred method of attachment is by means of the removable pin 26, which if desired, may be supported from the rim section by means of the chain 27.

The operation of this device is as follows:

Assuming that the wheel has mounted upon it a tire whose removal is desired, whether the inner surfaces of the rubber be rusted upon the rim, or not, it is obvious that the easiest method of separating the rubber and metal surfaces will be by contraction of the wheel structure. To effect this, the bolts 19 which normally hold the web sections 17 and 18 against relative movement are first removed, and the gear wheel 22 is then rotatably actuated so as to draw the ratcheted bar 23 away from the rim section 14 with which its end is connected. This consequently draws the free end of the rim section with it, throwing it out of the previously prevailing circular alignment of the other rim section 13, and as the retraction progresses, and as well because of the hinge connections between the rim connections 13 and 14, drawing the rim section 14 away from the inner face of the tire casing as well; this is brought out with particular clearness in Figure 6. The removal of the tire from the remaining portion of the rim's surface is then easy.

After a new or repaired tire has been placed in position over the rim section 12, the relative projection of this and the other parts to one another is accomplished by actuation of the gear wheel 22, so that the ratchet bar 24 is projected outwardly, forcing with it its connected rim section 14 to a point where the lip or plate 16 firmly engages the underface of the adjacent free end of the rim section 12. When this position has been reached, the bolts 19 may be then put in position to lock the web members and with them their rim sections in this extended position, and, if desired, the gear and ratchet construction illustrated may be removed entirely by withdrawal of the pin 26 and pulling the whole cage or shell away from its over-engagement relatively to the pin 20. If, however, it is desired to leave this in position on the wheel web, the extended position of the parts may be further insured by the locking of the ratchet bar in its projected position by swinging into operative engagement between the proper ones of its teeth the tip or nose of the dog 28, which is pivotally supported upon the shell or cage 21; when further retractile movement of the parts is desired, the manual release of this dog from its locking position as the first step theretoward is an easy matter.

While it will be apparent that the illustrated embodiments of our invention herein disclosed are well calculated to adequately fulfill the objects and advantages primarily stated, it is to be understood that the invention is susceptible to variation, modification and change within the spirit and scope of the subjoined claims.

What we claim is:

1. A disc wheel, having, in combination with a plurality of flexibly connected rim sections, partially overlapping web members, carried by two of said rim sections, a rotatable gear member carried by one of said rim sections, a ratcheted bar detachably connected at one end with an end portion of one of said rim sections and adapted to be operatively engaged for lengthwise actuation by the teeth of said gear member when the latter is rotated, whereby such rim section may be drawn away from or projected into position of true circular alignment with the other rim sections, and means for locking the parts in extended position.

2. In a disc wheel, in combination with a plurality of rim sections, the meeting ends of certain of which are hingedly connected, a pair of partially overlapping web members each of which is carried by one of said rim sections, manually actuatable means operatively connecting one of said web sections and the free end of one of said rim sections, whereby the latter may be drawn away from or projected into position of circular alignment with the other rim sections, and means for locking the parts in such extended circular position.

3. The combination, with a pair of partially overlapping web sections, of a plurality of rim sections certain of which are hingedly connected at their ends and two of which are connected with the marginal edge of one or the other of said web sections, and a projecting and retracting member operatively connected with one of said web sections and with the free end of one of said rim sections, whereby the latter may be moved into and out of peripheral alignment with the remaining rim sections.

4. In combination with a plurality of hingedly connected rim sections, partially overlapping web sections connected along their outer edges with certain of said rim sections, detachable means operatively connecting the free end of one of said rim sections with one of said web sections, whereby the former may be moved into and out of true circular alignment with the remaining rim sections, and means independent of said last-mentioned means for locking the web sections and with them their rim sections in extended position.

5. In combination with a plurality of terminally and flexibly correlated rim sections, partially overlapping web sections appurtenant to certain of said rim sections, means for locking the web sections and consequently their rim sections in extended position, and detachable means operatively connectible with one of said web sections and with the free end of one of the rim sections, whereby, when the last mentioned means are not in position, said rim section may be moved into and out of circularly aligned position relatively to the other rim sections.

In testimony whereof we sign this specification.

PETER CHRISTIA.
GEORGE CHRISTIA.